Patented Feb. 2, 1932

1,843,328

UNITED STATES PATENT OFFICE

ALFRED L. KVENVOLD, OF ALBERT LEA, MINNESOTA

CATTLE-STANCHION

Application filed April 13, 1929. Serial No. 354,872.

The object of my invention is to provide a simple, economical and effective animal stanchion designed especially for use in stabling cows, the construction and arrangement being such that the cattle detained thereby may have practically an unlimited movement so far as the swinging of the head.

Another object of my invention is to provide a novel means for locking the stanchion in its closed position.

Another object of the invention is to provide means so that when in open position it cannot swing.

Still another object of my invention is to provide a strong and durable stanchion composed of fewer parts than any of the so-called two-way stanchions.

With the foregoing and other objects in view, the invention consists of the novel construction hereinafter more specifically described, and illustrated in the accompanying drawings; but it is to be understood that changes, variations and modifications may be resorted to without departing from the scope of the appended claims.

In describing the invention in detail, reference is had to the accompanying drawings which form a part of this specification and wherein like characters of reference indicate corresponding parts throughout the several views, in which—

Figure 1:
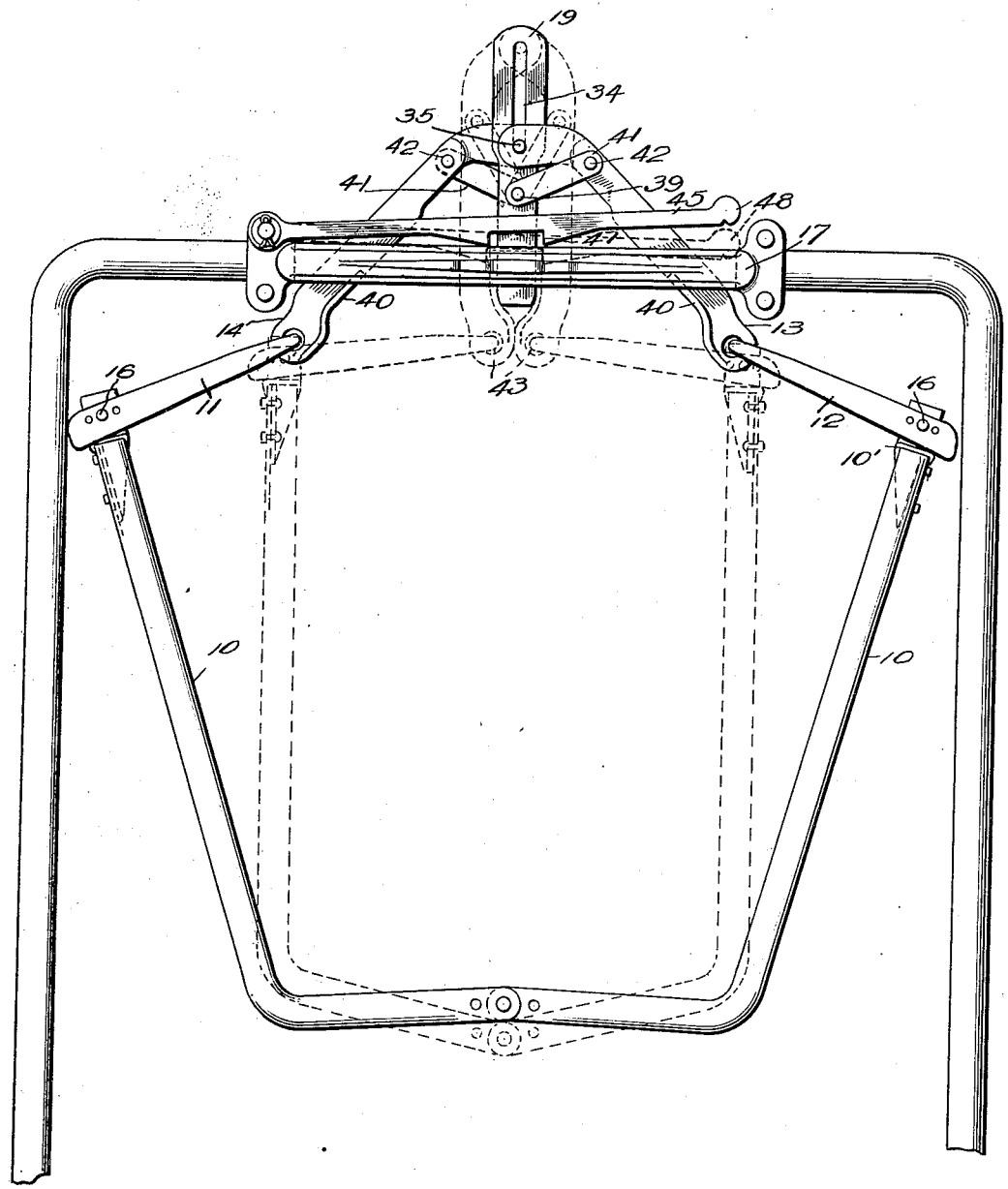
Figure 1 is a view of the improved stanchion in elevation.
Figure 2:
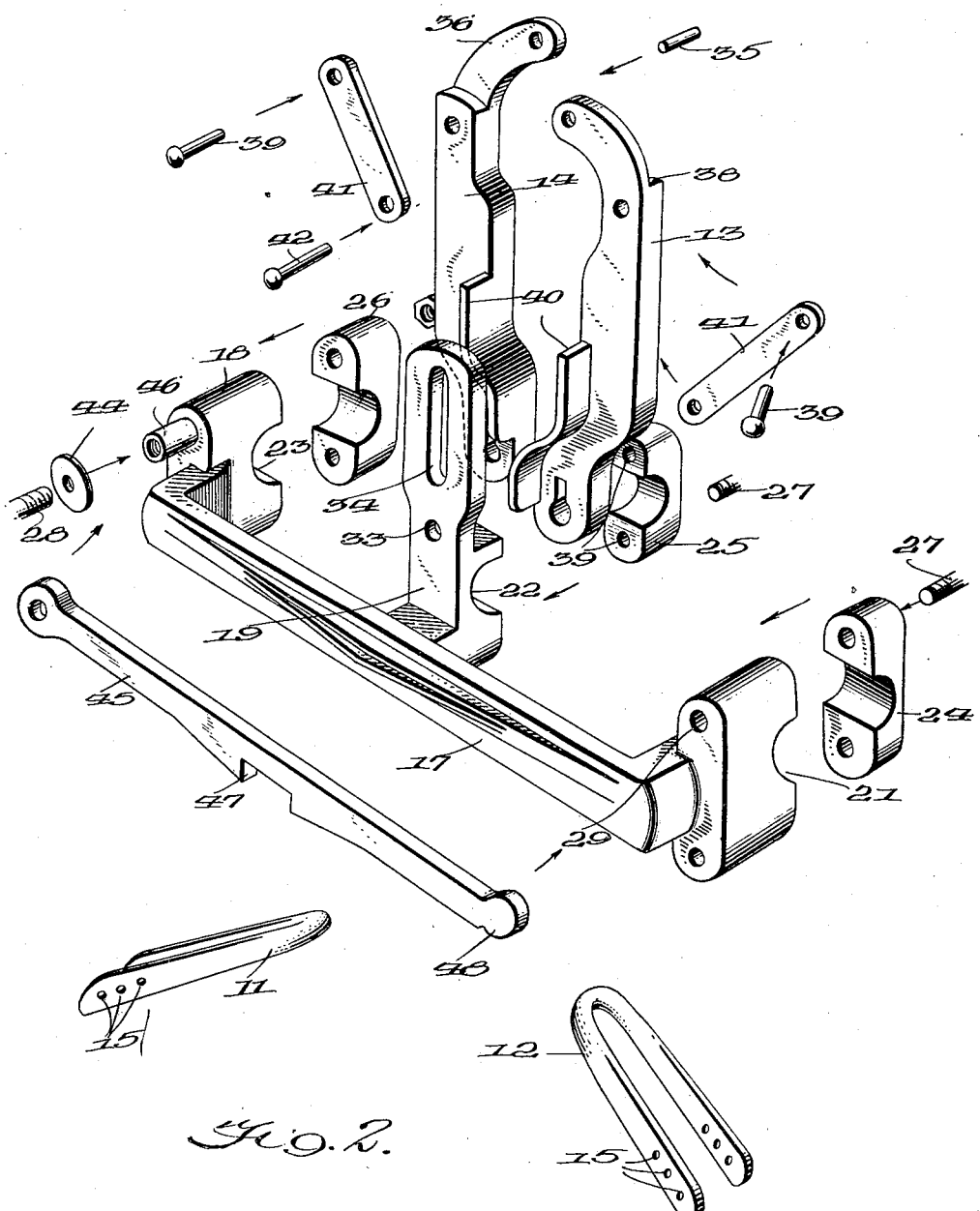
Figure 2 is a detail view of the parts making up my improved stanchion.

Referring to the drawings in detail, 10 represents the sides of the stanchion; 11 and 12 the staples or links which serve as connections between the side members 10 and the expanding arms 13 and 14. The connecting links 11 and 12 are provided with a series of apertures 15 through which pass bolts 16 in securing the links to the side members 10 of the stanchion frame. The sides 10 of the stanchion have a shoulder 10' formed near their upper ends to prevent the members 11 and 12 from dropping into the vertical position.

Spaced above the upright members 10 but connected therewith is horizontal member 17. Formed integral with the horizontal member are members 18, 19 and 20 which have formed in the back thereof horizontal grooves 21, 22 and 23. The horizontal member 17 is placed so that the grooves fit against the stall pipe or frame at the desired height and the clamping members 24, 25 and 26 are placed on the opposite side of the stall pipe. The member 17 is then securely fastened to the stall pipe by bolts 27 and 28 which pass through apertures 29 and 30, the bolts being secured in the apertures by nuts 31 and 32.

The upright member 19 is formed at substantially the mid portion of the horizontal member 17 and is offset therefrom as indicated at 37. In the upright member 19 are aperture 33 and elongated opening 34.

The expanding arms 13 and 14 are hingedly connected at their upper ends by bolt or rivet 35. The upper portions of the arms 13 and 14 are provided with cut-away portions 36 and 38. The arms 13 and 14 are placed on the opposite side of the upright member 19, and rivet 35 in connecting the arms passes through the elongated opening 34 in the upright member.

Secured by bolt 39 to the expanding arms just below the cut-away portion are members 41, the opposite ends of which are secured to the upright member 19 by rivets 42. Expanding arms 13 and 14 are provided with offset members 40 near the lower end thereof which serve as part of the locking means. In the lower end of the expanding arms 13 and 14 are apertures 43 through which pass the connecting links 11 and 12 in connecting the side arms 10 to the expanding arms.

The connecting links act as a swivel and permit the stanchion to be turned halfway around in either direction by the animal detained thereby. An aperture 30 extends through the stud 46 upon which is pivotally secured latch 45 by washer 44 and bolt 28. Latch 45 is provided with a cut out portion 47 which is adapted to fit over the offset portions 40 locking the stanchion. The free end of the latch bar 45 has a handle 48 formed integral therewith.

Upon slight elevation of the latch, the stanchion opens up automatically due to the arrangement of the members 41 and the movement of the expanding arms 13 and 14. Expanding arms 13 and 14 slide back and forth between members 17 and the stall pipe 49 when the stanchion opens and closes.

When the device is in the open position and it is desired to detain therein an animal, a slight pressure is exerted against one or both sides of the upright member 10 causing them to move inwardly until latch 45 drops in place over the lugs 40 on the expanding arms 13 and 14, thus locking the stanchion in closed position.

What I claim is:

1. In a stanchion, expanding arms, a horizontal member having an upright member for supporting said expanding arms, said expanding arms hingedly secured together at their upper ends, connecting links loosely secured in lower ends of expanding arms, a pair of spaced members secured in the outer ends of said connecting links, means of locking the expanding arms and offset members formed on the lower portions of the expanding arms for cooperating with said locking means.

2. In a stanchion, expanding arms, said expanding arms hingedly connected at their upper ends, a stall frame, a horizontal member adapted to be secured to said frame, a vertical member supported by the horizontal member, said vertical member having an elongated opening in the upper end thereof, said means for hingedly connecting the expending arms passing through said elongated opening, means for locking the expanded arms in the closed position, U shaped links, and upright members spaced below said horizontal member and connected to said expending arms by said links.

3. In a stanchion consisting of a horizontal member, an upright member carried by said horizontal member, an elongated opening in the upper end of said upright member, a pair of expanding arms flexibly connected with the upright member, means of limiting said expanding arms in their expansion, said means including a pin extending through said elongated opening, locking means for securing the expanding arms in closed position, a pair of spaced arms flexibly secured to the lower end of said expanding arms.

4. In a device for securing animals in stalls comprising a horizontal member, a pair of expanding arms, a pair of connecting links, a pair of spaced arms secured to the lower ends of said expanding arms by means of said connecting links, and a notched bar pivotally mounted on said horizontal member for locking the expanding arms in closed position.

5. In a device of the class described, a pair of spaced arms, a pair of expanding arms hingedly connected at their upper ends, connecting links for connecting said spaced arms and expanding arms, a horizontal member having an upright member formed integral therewith, said expanding arms flexibly supported by said upright member, and means of securing the expanding arms in closed position, said means comprising a notched bar and offset members on the expanding arms.

6. In a device for securing animals in stalls comprising a pair of spaced bars, a pair of expanding arms, links connecting said bars and said pair of expanding arms, said links being flexibly connected to said expanding arms, a horizontal member spaced above said bars, an upright member mounted on said horizontal member and adapted to support said expanding arms, said expanding arms hingedly connected at their upper ends, members connected to the expanding arms and to the upright member at a point lower than the point at which said members are connected to the expanding arms, means of locking said expanding arms in the contracted position, and means of connecting said upright member to the stall frame.

7. In a device of the class described comprising a stanchion, a horizontal member spaced above said stanchion, means of clamping said horizontal member to a supporting member, a locking bar pivotally mounted on said horizontal member, a pair of expanding arms supported by an upright member, said upright member formed integral with said horizontal member, offset shoulders formed on the expanding arms near the lower ends thereof for cooperating with said locking bar in securing the stanchion in the closed position connecting said expanding arms and the stanchion.

ALFRED L. KVENVOLD.